(12) United States Patent
Lettow

(10) Patent No.: US 10,082,830 B2
(45) Date of Patent: Sep. 25, 2018

(54) WEARABLE ELECTRONIC DEVICES

(71) Applicant: VORBECK MATERIALS CORP., Jessup, MD (US)

(72) Inventor: John S Lettow, Washington, DC (US)

(*) Notice: Subject to any disclaimer, the term of this patent is extended or adjusted under 35 U.S.C. 154(b) by 0 days.

(21) Appl. No.: 15/109,699

(22) PCT Filed: Jan. 5, 2015

(86) PCT No.: PCT/US2015/010196
§ 371 (c)(1),
(2) Date: Jul. 5, 2016

(87) PCT Pub. No.: WO2015/103563
PCT Pub. Date: Jul. 9, 2015

(65) Prior Publication Data
US 2016/0327979 A1    Nov. 10, 2016

Related U.S. Application Data

(60) Provisional application No. 61/923,749, filed on Jan. 5, 2014, provisional application No. 61/924,692, filed on Jan. 7, 2014, provisional application No. 62/018,683, filed on Jun. 30, 2014.

(51) Int. Cl.
| | | |
|---|---|---|
| *G06F 1/16* | (2006.01) | |
| *H05B 3/14* | (2006.01) | |
| *A41D 19/00* | (2006.01) | |
| *A41D 31/02* | (2006.01) | |
| *B60N 2/56* | (2006.01) | |
| *B62D 1/06* | (2006.01) | |

(52) U.S. Cl.
CPC ......... *G06F 1/163* (2013.01); *A41D 19/0006* (2013.01); *A41D 31/02* (2013.01); *B60N 2/56* (2013.01); *B62D 1/06* (2013.01); *H05B 3/145* (2013.01)

(58) Field of Classification Search
CPC ....................................... G06F 1/163
See application file for complete search history.

(56) References Cited

U.S. PATENT DOCUMENTS

| | | | |
|---|---|---|---|
| 5,942,733 A * | 8/1999 | Allen ................. | G06K 9/00335 178/18.01 |
| 8,260,384 B2 | 9/2012 | Wulff | |
| 2002/0019296 A1* | 2/2002 | Freeman ................. | A63F 13/02 482/4 |
| 2002/0025837 A1* | 2/2002 | Levy ..................... | G06F 3/0235 455/566 |
| 2006/0012566 A1 | 1/2006 | Siddeeq | |
| 2012/0194976 A1 | 8/2012 | Golko | |
| 2012/0244333 A1* | 9/2012 | Aksay ....................... | D01F 1/09 428/221 |
| 2012/0286808 A1* | 11/2012 | Fergen .................... | G06F 3/044 324/658 |
| 2013/0191741 A1* | 7/2013 | Dickinson ............... | G06F 1/163 715/702 |
| 2013/0215068 A1* | 8/2013 | Jeon ........................ | G06F 3/044 345/173 |
| 2013/0285970 A1* | 10/2013 | Ahn ........................ | G06F 3/044 345/173 |
| 2013/0309448 A1* | 11/2013 | Striegler ............... | C03C 17/322 428/141 |

(Continued)

*Primary Examiner* — Xanthia C Cunningham
(74) *Attorney, Agent, or Firm* — Trentice V. Bolar, Esq.

(57) ABSTRACT

Wearable electronic devices that comprise an article of apparel that comprises at least one electronic or electrical component.

10 Claims, 4 Drawing Sheets

(56) References Cited

U.S. PATENT DOCUMENTS

| | | | | |
|---|---|---|---|---|
| 2014/0147478 A1* | 5/2014 | Li | C09J 133/14 | 424/401 |
| 2014/0160064 A1* | 6/2014 | Yairi | G06F 3/04895 | 345/174 |
| 2014/0318699 A1* | 10/2014 | Longinotti-Buitoni | A61B 5/0002 | 156/247 |
| 2014/0320435 A1* | 10/2014 | Modarres | G06F 3/0412 | 345/173 |
| 2015/0041786 A1* | 2/2015 | Li | H01Q 1/44 | 257/40 |
| 2015/0065090 A1* | 3/2015 | Yeh | H04W 12/06 | 455/411 |
| 2015/0111025 A1* | 4/2015 | Nishino | H01B 1/24 | 428/323 |
| 2015/0138699 A1* | 5/2015 | Yamazaki | G06F 1/163 | 361/679.03 |
| 2015/0351207 A1* | 12/2015 | Tung | H05F 1/02 | 345/30 |
| 2016/0058133 A1* | 3/2016 | Fournier | H04B 1/3888 | 455/41.2 |
| 2016/0103489 A1* | 4/2016 | Cruz-Hernandez | G06F 3/016 | 345/161 |
| 2016/0134737 A1* | 5/2016 | Pulletikurty | G06F 3/0227 | 715/735 |
| 2016/0157372 A1* | 6/2016 | Hiroki | G06F 1/1652 | 361/748 |
| 2016/0250875 A1* | 9/2016 | Tarnowski | H05K 3/1275 | |
| 2016/0283086 A1* | 9/2016 | Inagaki | G06F 1/1626 | |
| 2016/0299526 A1* | 10/2016 | Inagaki | G06F 1/163 | |
| 2016/0338644 A1* | 11/2016 | Connor | A41D 1/002 | |
| 2016/0351975 A1* | 12/2016 | Momo | H01M 10/0562 | |

* cited by examiner

US 10,082,830 B2

WEARABLE ELECTRONIC DEVICES

REFERENCE TO RELATED APPLICATIONS

The present application claims priority to U.S. Provisional Application 61/923,749, filed on Jan. 5, 2014, U.S. Provisional Application 61/924,692, filed on Jan. 7, 2014, and U.S. Provisional Application 62/018,683, filed on Jun. 30, 2014, the entire contents of which are hereby incorporated by reference.

FIELD OF THE INVENTION

The present invention relates to wearable electronic devices that comprise an article of apparel that comprises at least one electronic or electrical component.

BACKGROUND

As electronic devices become more ubiquitous in society, there is an increasing desire to have them at hand for ready use and access. It would thus be desirable to obtain electronic devices that can be worn as an article of apparel.

SUMMARY OF THE INVENTION

Disclosed and claimed herein are wearable electronic devices that comprise an article of apparel that comprises at least one electronic or electrical component. Also disclosed and claimed herein are wearable electronic devices wherein at least a part of at least one electronic or electrical component comprises an ink or coating

DETAILED DESCRIPTION OF THE INVENTION

The wearable electronic devices of the present invention comprise a piece of apparel containing at least one electronic component.

By apparel is meant clothing, accessories, or other articles worn by a person or other being, such as a non-human animal. Examples include clothing, footwear, headwear, accessories, etc. Examples include shirts, pants, shorts, overalls, coveralls, jackets, coats, vests, aprons, underwear, diapers, socks, scarves, ties, cravats, bibs, gloves, mittens, gauntlets, shoes, sandals, boots, gloves, mittens, hats, caps, visors, headbands, helmets, straps, bands, shoulder straps, wrist straps, wrist bands, leg straps, leg bands, arm bands, arm straps, cuffs, harnesses, collars, bandoliers, bracelets, belts, suspenders, bandoliers, glasses, goggles, necklaces, lanyards, rings, etc. They can be wore on the arms, wrists, legs, knees, thighs, ankles, chest, shoulders, head, waist, etc.

The wearable electronic devices can be worn by animals such as pets, dogs, seeing-eye dogs and other service animals, cats, ferrets, horses, livestock, etc.

Figure 1:
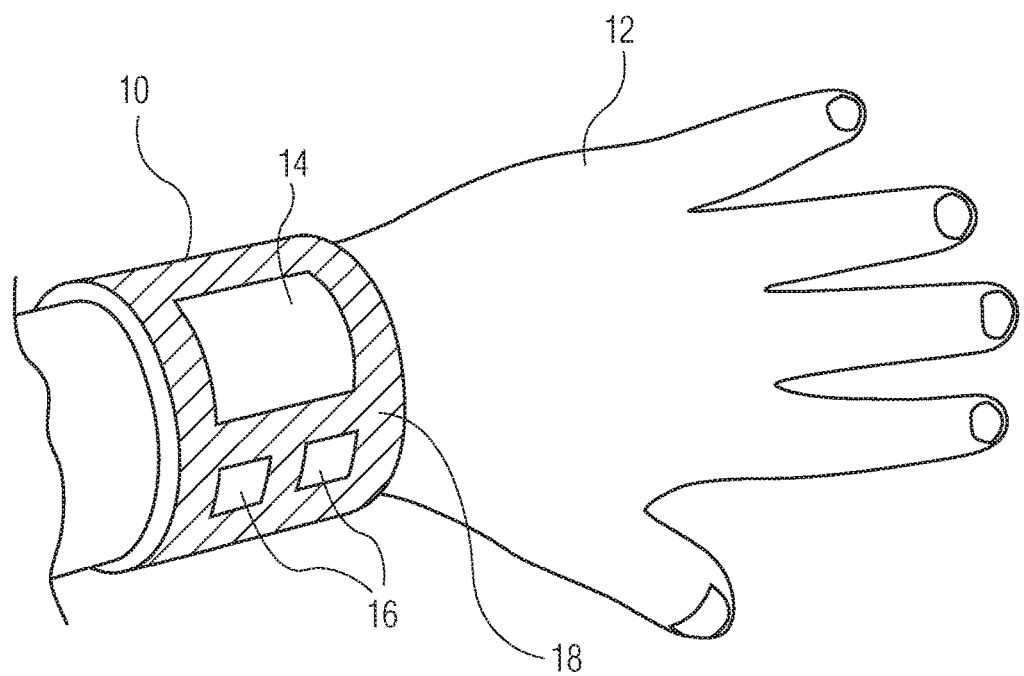
FIG. 1 shows a wearable electronic device comprising a wristband and display and/or input device and control buttons.

FIG. 1 shows a wearable electronic device 10 that is worn on a wrist 12. The device 10 comprises an input device component and/or display (e.g., a touchpad, display, touch screen, etc.) 14 and control buttons 16. The device 10 includes a wrist band 18 and can be made from a fabric.

Figure 2:
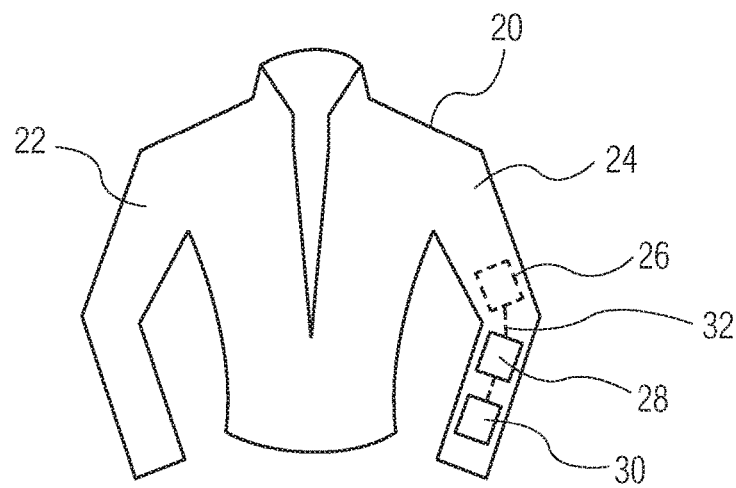
FIG. 2 shows a wearable electronic device comprising a jacket.

FIG. 2 shows a wearable electronic device 20 that comprises a jacket 22. Sleeve 24 of the jacket comprises battery 26 enclosed in the fabric of the jacket, display 30, and input device component 28. The components are connected by wires 30 that are enclosed in the fabric of the jacket.

The electronic devices can be used independently of other devices, to control one or more additional remote devices, and/or be controlled by one or more additional remote devices. Connection to the remote devices can be wireless or wired.

The electronic devices can comprise one or more electronic, electrical, or other components, such as microprocessors, input devices, buttons, ports, adapters, controllers, displays, ports, data-exchange devices, wireless devices, antennas, accelerometers, speakers, microphones, cameras, headphone/microphone/speaker jacks, sensors, vibrators, haptic technology, keyboards, membrane switches, heat sinks, batteries, storage devices (such as hard drives, flash memory, solid state drives, memory cards, etc.), communications devices, modems, interface devices, lights or indicators (such as LED lights), digitizers, RFID readers, RFID transmitters, solar panels, music or media players, voice recognition devices and software, etc. Adapters can include USB adapters, Bluetooth adapters, wireless adapters, Wi-Fi adapters, cellular adapters, FireWire adapters, ethernet adapters, infrared adapters, etc.

Examples of displays include LCD and LED displays and touchscreens (including capacitive (including those based on surface capacitance, projected capacitance, mutual capacitance, self-capacitance, matrix approach, etc.), resistive, surface acoustic wave, infrared touch, optical imaging, dispersive signal technology, acoustic pulse recognition, etc. displays.

In some cases, one or more components can be flexed, bent, folded, creased, curled, rolled, crumpled, twisted, or otherwise distorted.

Examples of input devices can include touchpads (also referred to as trackpads), touch screens, keyboards, buttons, non-contact input devices, etc. Multitouch input devices, gesture recognition input devices, etc. can be used.

The electronic devices can be connected to or communicate with other devices using any suitable method or hardware (such as adapters). Connections can be wireless and/or wired. Methods include USB, FireWire, HDMI, ethernet, Wi-Fi, cellular, infrared (IR), near-field communication (NFC), RFID, parallel devices, serial devices, modems, etc.

The devices can be powered by AC or DC current, cells or batteries, USB connections, solar power, mains power, or any suitable method. Cells and batteries can be integrated into the device, kept in the vicinity of the device, or worn in a different part of the body from the device. Cells and batteries can be rechargeable, disposable, etc. They can be charged from solar panels. The cells and batteries can comprise coin cells.

The devices or components thereof can be attached to and/or integrated into the article of apparel. Devices can be attached and/or integrated into the article of apparel using any suitable means, such as by sewing, gluing, laminating, snaps, buttons, zippers, tying, hook and loop (e.g. Velcro®) type attachments, tacks, rivets, fasteners, etc. Some components of the devices can be exposed on the surface of the article of apparel and other fully or partially enclosed within the article.

The devices or components thereof can be constructed as part of the articles of apparel. For example, components can be printed or otherwise formed directly onto the materials that make up the articles of apparel. Components can be mounted onto the materials that make up the articles of apparel. Different components can be placed in different locations on the article of apparel. Components can be positioned in such a way as to enhance the flexibility of the device, for example.

In some cases, the wearable electronic device can comprise two or more types of components: the apparel article, at least one flexible display and/or input device (e.g. display, touchpad, touch screen, etc.), and, optionally, one or more rigid electronic components (e.g. batteries, microprocessors, USB adapters, Bluetooth adapters, Wi-Fi adapters, speakers, accelerometers, or other components, such as those disclosed above). Some or all of these other components can also be flexible. The devices can have buttons, or other control components, which can be flexible. In some cases, the flexible display and/or input device and/or control buttons can have a bending or folding angle or radius of curvature as indicated below.

In some cases, including the devices having two or more components including at least one flexible display and/or input device, the wearable electronic devices, including the can be in the form of a strap, band, belt, etc. that can be worn on the body (fastened or unfastened in position) or taken off and used unattached. In some cases the devices can be folded, bent, creased etc. for storage and transportation (such as in a bag, pocket, etc.).

Figure 3:
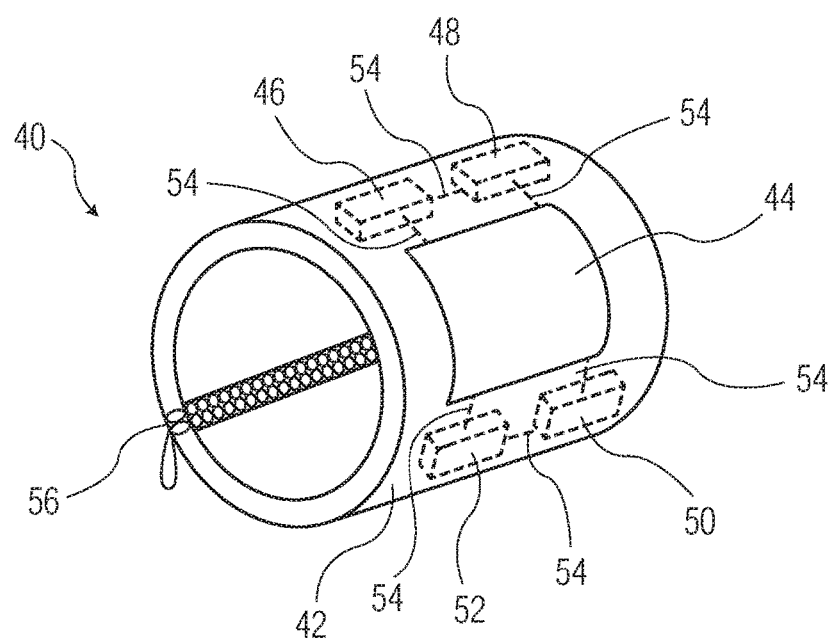
FIG. 3 shows a wearable electronic device comprising a wristband having a display, touchpad, and/or screen and additional electronic components.

FIG. 3 shows a wearable electronic device 40 that comprises a wristband 42. Display, touchpad, and/or touch screen 44 is exposed to the surface of device 40. Components 46, 48, 50, and 52 are embedded within the wristband and are connected via flexible wires or connectors 54, which are also embedded within the wristband. The wristband is fastened with zipper 56 or other fasteners and closures such as hook and loop fasteners, snaps, buttons, ties, etc. Examples of components 46, 48, 50, and 52 include batteries, microprocessors, USB adapters, Bluetooth adapters, Wi-Fi adapters, speakers, accelerometers, etc. The components and connectors are flexible enough and arranged in such a way as to allow the wristband to be curved.

Figure 4A:
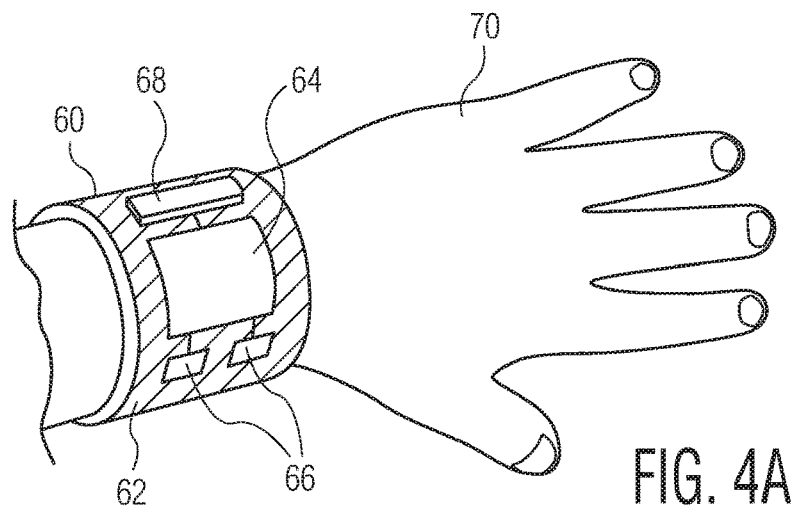
FIG. 4(a) shows a wearable electronic device worn on a wrist.
Figure 4B:
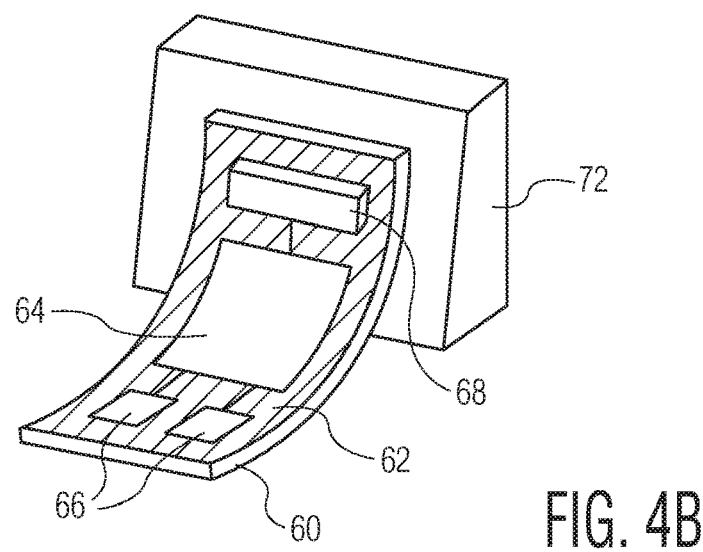
FIG. 4(b) shows a wearable electronic device that is leaning against an object.
Figure 4C:
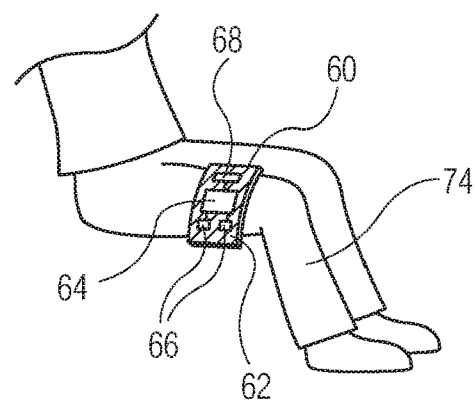
FIG. 4(c) shows a wearable electronic device that is worn on a leg.

FIG. 4(*a*) shows a wearable electronic device 60 worn fastened in place on wrist 70 that comprises a wristband 62, a flexible display and/or input device 64 that is curved backward around wrist 70, control buttons 66, and rigid component 68.

FIG. 4(*b*) shows device 60 removed from its wearer and positioned leaning against object 72. Flexible display and/or input device 64 is curved forward.

FIG. 4(*c*) shows device 60 draped over leg 74 (it could also be fastened in place).

Examples of materials for the apparel include cloths and fabrics (such as cotton, canvas, wool, flannel, nylon, ballistic nylon, duck cloth, polyester, polyurethane, polyethylene, Gore-Tex®, spandex, aramids (such as Kevlar®, Nomex®, etc.), etc.), leather, suede, plastics, rubber, elastomers, foams (such as memory foam), metals, foils, films, paper and paperboard, cardboard, etc.

The electronic devices can be made waterproof or water resistant. For example, they can be encapsulated or sealed into a waterproof or water resistant pouch. They can be sealed by vacuum sealing, heat sealing, or any suitable method. They can be washable and/or submersible.

The electronic devices can be receivers, personal digital assistants, music, video, or other media players, games, calculators, reading devices, watches, etc. They can be controllers for or interact with GPS and navigation systems, computers, laptop computers, tablet computers, telephones, PDAs, electronic readers, video game systems and consoles, stereo systems, televisions, music players, video players, network devices, toys, robots, medical equipment, remote- or radio-controlled devices (such as cars, boats, airplanes helicopters, drones, etc.) including remote- or radio-controlled toys. They can be controllers for heating and cooling devices, thermostats, etc.

The devices can be used for medical, sports and exercise, military, first responder (such as firefighter, etc.), security, etc. applications. They can be used as barcode readers, smartcard readers, RFID tag readers, magnetic strip readers, etc.

The electronic devices can contain sensors or detectors, such as those that detect or sense temperature or heat, position, acceleration or speed, moisture, chemicals, smokes, gases (such as carbon dioxide, carbon monoxide, oxygen, etc.), pressure, etc.

The sensors can be used for medical, health, athletic, physiological, biometric, etc. applications, such as hydration sensors, biometric sensors, medical sensors, heart rate sensors, sweat sensors, glucose level sensors, vital signs sensors, oxygen-level sensors, body temperature sensors, moisture level sensors, breathing sensors, body fat sensors, bioimpedance sensors, etc.

The devices can have haptic capabilities, providing force feedback, vibration feedback, etc. Devices having hapatic capabilities can be used as controllers, such as video game controllers, controllers for remote- or radio-controlled devices, etc.

The devices can be used in addition or as a supplement to game controllers normally used with games (e.g., as a secondary controller). They can provide special input buttons. In some cases, special function input buttons could be specific to certain games (such as to provide special views, activate certain properties or powers, call in certain playing features (such as weapons, airplanes, vehicles, etc.), provide the ability to control extra or secondary characters, etc. For example, a device in the form of a wristband could be used to control a special character, such as one wearing a similar wristband.

Examples of video game systems and consoles and software include those manufactured by Nintendo, Sony, Microsoft, Atari, Sega, etc. such as Xbox, PlayStation, Nintendo Entertainment System, Wii, etc. Examples of video games and games series include Call of Duty, Mario Bros. games, Wii games, Minecraft, Tetris, Grand Theft Auto, Pokemon games, Halo, Minecraft, Tomb Raider, Gran Turismo, Guild Wars, Gears of War, The Elder Scrolls, Guitar Hero, Mortal Kombat, Madden games, etc.

In some cases (such as by means of an accelerometer), the electronic devices may be used to control other devices by motion. For example, if the apparel containing the electronic device is worn on an appendage such as arm, wrist, finger, leg, ankle, head, etc., by moving the appendage in different directions or at different speeds, the user can control other devices, such as radio controlled devices, stereo systems, video games, music players, etc.

In some cases, the devices can have a maximum thickness of about 5 cm, or of about 3 cm, or of about 2 cm, or of about 1 cm, or of about 8 mm, or of about 6 mm, or of about 4 mm, or of about 2 mm, or of about 1 mm, or of about 750 micrometers, or of about 500 micrometers, or of about 250 micrometers, or of about 100 micrometers, or of about 50 micrometers, or of about 10 micrometers, or of about 1 micrometer.

In some cases, the devices can have an average thickness of about 5 cm, or of about 3 cm, or of about 2 cm, or of about 1 cm, or of about 8 mm, or of about 6 mm, or of about 4 mm, or of about 2 mm, or of about 1 mm, or of about 750 micrometers, or of about 500 micrometers, or of about 250 micrometers, or of about 100 micrometers, or of about 50 micrometers, or of about 10 micrometers, or of about 1 micrometer.

In some cases, the devices can have a thickness of about 50 micrometers to about 5 cm, or of about 50 micrometers to about 3 cm, or of about 50 micrometers to about 2 cm, or of about 50 micrometers to about 1 cm, or of about 50 micrometers to about 8 mm, or of about 50 micrometers to about 6 mm, or of about 50 micrometers to about 4 mm, or of about 50 micrometers to about 2 mm, or of about 50 micrometers to about 1 mm, or of about 50 micrometers to about 750 micrometers, or of about 50 micrometers to about 500 micrometers, or of about 50 micrometers to about 250 micrometers, or of about 50 micrometers to about 100 micrometers, or of about 100 micrometers to about 5 cm, or of about 100 micrometers to about 3 cm, or of about 100 micrometers to about 2 cm, or of about 100 micrometers to about 1 cm, or of about 100 micrometers to about 8 mm, or of about 100 micrometers to about 6 mm, or of about 100 micrometers to about 4 mm, or of about 100 micrometers to about 2 mm, or of about 100 micrometers to about 1 mm, or of about 100 micrometers to about 750 micrometers, or of about 100 micrometers to about 500 micrometers, or of about 100 micrometers to about 250 micrometers, or of about 250 micrometers to about 5 cm, or of about 250 micrometers to about 3 cm, or of about 250 micrometers to about 2 cm, or of about 250 micrometers to about 1 cm, or of about 250 micrometers to about 8 mm, or of about 250 micrometers to about 6 mm, or of about 250 micrometers to about 4 mm, or of about 250 micrometers to about 2 mm, or of about 250 micrometers to about 1 mm, or of about 250 micrometers to about 750 micrometers, or of about 250 micrometers to about 500 micrometers, or of about 500 micrometers to about 5 cm, or of about 500 micrometers to about 3 cm, or of about 500 micrometers to about 2 cm, or of about 500 micrometers to about 1 cm, or of about 500 micrometers to about 8 mm, or of about 500 micrometers to about 6 mm, or of about 500 micrometers to about 4 mm, or of about 500 micrometers to about 2 mm, or of about 500 micrometers to about 1 mm, or of about 500 micrometers to about 750 micrometers, or of about 750 micrometers to about 5 cm, or of about 750 micrometers to about 3 cm, or of about 750 micrometers to about 2 cm, or of about 750 micrometers to about 1 cm, or of about 750 micrometers to about 8 mm, or of about 750 micrometers to about 6 mm, or of about 750 micrometers to about 4 mm, or of about 750 micrometers to about 2 mm, or of about 750 micrometers to about 1 mm, or of about 1 mm to about 5 cm, or of about 1 mm to about 3 cm, or of about 1 mm to about 2 cm, or of about 1 mm to about 1 cm, or of about 1 mm to about 8 mm, or of about 1 mm to about 6 mm, or of about 1 mm to about 4 mm, or of about 1 mm to about 2 mm, or of about 2 mm to about 5 cm, or of about 2 mm to about 3 cm, or of about 2 mm to about 2 cm, or of about 2 mm to about 1 cm, or of about 2 mm to about 8 mm, or of about 2 mm to about 6 mm, or of about 2 mm to about 4 mm, or of about 4 mm to about 5 cm, or of about 4 mm to about 3 cm, or of about 4 mm to about 2 cm, or of about 4 mm to about 1 cm, or of about 4 mm to about 8 mm, or of about 4 mm to about 6 mm, or of about 6 mm to about 5 cm, or of about 6 mm to about 3 cm, or of about 6 mm to about 2 cm, or of about 6 mm to about 1 cm, or of about 6 mm to about 8 mm, or of about 8 mm to about 5 cm, or of about 8 mm to about 3 cm, or of about 8 mm to about 2 cm, or of about 8 mm to about 1 cm, or of about 1 cm to about 5 cm, or of about 1 cm to about 3 cm, or of about 1 cm to about 2 cm, or of about 2 cm to about 5 cm, or of about 2 cm to about 3 cm, or of about 3 cm to about 5 cm.

Thicknesses can be based on the thickness of the electronic components of the device or of the article of apparel or the article of apparel in the area containing the device and its components.

The wearable electronic devices are flexible. In some cases, the entire device, a portion of the device, a display and/or input device component, etc. can be bent, creased, folded, curled, curved, crumpled, crinkled, etc.

Figure 5:
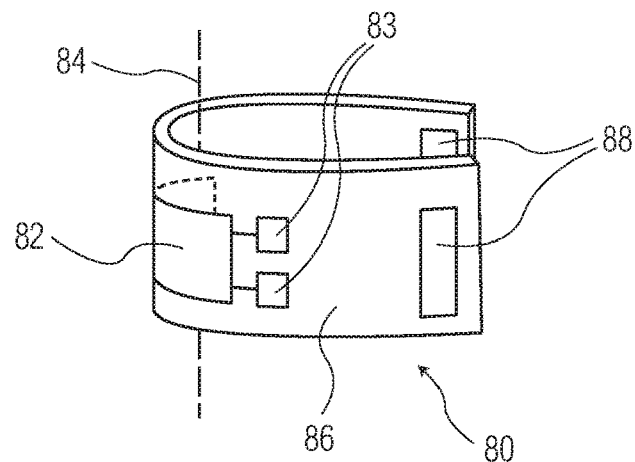
FIG. 5 shows a folded wearable electronic device.

FIG. 5 shows a wearable electronic device 80 having a strap 86, a display and/or input device 82 and other components 83. The device is bent or folded along axis 84. The strap comprises hook and loop fasteners 88 or other fasteners and closures such as zippers, snaps, buttons, ties, etc. that can be used to hold the device in place when worn.

In some cases, the entire device, a portion of the device, a display and/or input device component, etc. can be bent or folded from a flat position at any angle up to about 360°, such as up to about 270°, up to about 225°, up to about 180°, up to about 135°, up to about 90°, up to about 45°, up to about 30°, up to about 20°, up to about 10°, and up to about 5°, or from a flat position to an angle of from about 5° to about 360°, or about 10° to about 360°, or about 20° to about 360°, or about 30° to about 360°, or about 45° to about 360°, or about 90° to about 360°, or about 135° to about 360°, or about 180° to about 360°, or about 225° to about 360°, or about 225° to about 360°, or about 270° to about 360°, or about 5° to about 270°, or about 20° to about 270°, or about 30° to about 270°, or about 45° to about 270°, or about 90° to about 270°, or about 135° to about 270°, or about 180° to about 270°, or about 225° to about 270°, or about 5° to about 225°, or about 20° to about 225°, or about 30° to about 225°, or about 45° to about 225°, or about 90° to about 225°, or about 135° to about 225°, or about 180° to about 225°, or about 5° to about 180°, or about 20° to about 180°, or about 30° to about 180°, or about 45° to about 180°, or about 90° to about 180°, or about 135° to about 180°, or about 5° to about 135°, or about 20° to about 135°, or about 30° to about 135°, or about 45° to about 135°, or about 90° to about 135°, or about 5° to about 90°, or about 20° to about 90°, or about 30° to about 90°, or about 45° to about 90°, or about 5° to about 45°, or about 20° to about 45°, or about 30° to about 45°, or about 5° to about 30°, or about 20° to about 30°, or about 5° to about 20°.

In some cases, when the entire device, a portion of the device, a display and/or input device component, etc. is bent, folded, curled, etc. the radius of curvature can be no more than about 30 cm, or about 20 cm, or about 10 cm, or about 5 cm, or about 2 cm, or about 1 cm, or about 5 mm, or about 2 mm, or about 1 mm, or about 750 micrometers, or about 500 micrometers, or about 250 micrometers, of about 100 micrometers, or about 50 micrometers, or about 10 micrometers.

In some cases, the radius of curvature can be of from about 1 micrometer to about 30 cm, or of from about 1 micrometer to about 20 cm, or of from about 1 micrometer to about 10 cm, or from about 1 micrometer to about 5 cm, or of from about 1 micrometer to about 2 cm, or of from about 1 micrometer to about 1 cm, or of from about 1 micrometer to about 5 mm, or of from about 1 micrometer to about 2 mm, or of from about 1 micrometer of from about 1 mm, or of from about 1 micrometer to about 750 micrometers, or of from about 1 micrometer to about 500 micrometers, or of from about 1 micrometer to about 250 micrometers, or of from about 1 micrometer to about 100 micrometers, or of from about 1 micrometer to about 50 micrometers, or of from about 1 micrometer to about 10 micrometers, or of from about 10 micrometers to about 20 cm, or of from about 10 micrometers to about 10 cm, or from about 10 micrometers to about 5 cm, or of from about 10 micrometers to about 2 cm, or of from about 10 micrometers to about 1 cm, or of from about 10 micrometers to about 5 mm, or of from about 10 micrometers to about 2 mm, or of from about 10 micrometers of from about 1 mm, or of from about 10 micrometers to about 750 micrometers, or of from about 10 micrometers to about 500 micrometers, or of from about 10 micrometers to about 250 micrometers, or of from about 10 micrometers to about 100 micrometers, or of from about 10 micrometers to about 50 micrometers, or of from about 50 micrometers to about 20 cm, or of from about 50 micrometers to about 10 cm, or from about 50 micrometers to about 5 cm, or of from about 50 micrometers to about 2 cm, or of from about 50 micrometers to about 1 cm, or of from about 50 micrometers to about 5 mm, or of from about 50 micrometers to about 2 mm, or of from about 50 micrometers of from about 1 mm, or of from about 50 micrometers to about 750 micrometers, or of from about 50 micrometers to about 500 micrometers, or of from about 50 micrometers to about 250 micrometers, or of from about 50 micrometers to about 100 micrometers, or of from about 100 micrometers to about 20 cm, or of from about 100 micrometers to about 10 cm, or from about 100 micrometers to about 5 cm, or of from about 100 micrometers to about 2 cm, or of from about 100 micrometers to about 1 cm, or of from about 100 micrometers to about 5 mm, or of from about 100 micrometers to about 2 mm, or of from about 100 micrometers of from about 1 mm, or of from about 100 micrometers to about 750 micrometers, or of from about 100 micrometers to about 500 micrometers, or of from about 100 micrometers to about 250 micrometers, or of from about 250 micrometers to about 20 cm, or of from about 250 micrometers to about 10 cm, or from about 250 micrometers to about 5 cm, or of from about 250 micrometers to about 2 cm, or of from about 250 micrometers to about 1 cm, or of from about 250 micrometers to about 5 mm, or of from about 250 micrometers to about 2 mm, or of from about 250 micrometers of from about 1 mm, or of from about 250 micrometers to about 750 micrometers, or of from about 250 micrometers to about 500 micrometers, or of from about 500 micrometers to about 20 cm, or of from about 500 micrometers to about 10 cm, or from about 500 micrometers to about 5 cm, or of from about 500 micrometers to about 2 mm, or of from about 500 micrometers to about 1 cm, or of from about 500 micrometers to about 5 mm, or of from about 500 micrometers to about 2 mm, or of from about 500 micrometers of from about 1 mm, or of from about 500 micrometers to about 750 micrometers, or of from about 750 micrometers to about 20 cm, or of from about 750 micrometers to about 10 cm, or from about 750 micrometers to about 5 cm, or of from about 750 micrometers to about 2 cm, or of from about 750 micrometers to about 1 cm, or of from about 750 micrometers to about 5 mm, or of from about 750 micrometers to about 2 mm, or of from about 750 micrometers of from about 1 mm, or of from about 1 mm to about 20 cm, or of from about 1 mm to about 10 cm, or from about 1 mm to about 5 cm, or of from about 1 mm to about 2 cm, or of from about 1 mm to about 1 cm, or of from about 1 mm to about 5 mm, or of from about 1 mm to about 2 mm, or of from about 2 mm to about 20 cm, or of from about 2 mm to about 10 cm, or from about 2 mm to about 5 cm, or of from about 2 mm to about 2 cm, or of from about 2 mm to about 1 cm, or of from about 2 mm to about 5 mm, or of from about 5 mm to about 20 cm, or of from about 5 mm to about 10 cm, or from about 5 mm to about 5 cm, or of from about 5 mm to about 2 cm, or of from about 5 mm to about 1 cm, or of from about 1 cm to about 20 cm, or of from about 1 cm to about 10 cm, or from about 1 cm to about 5 cm, or of from about 1 cm to about 2 cm, or of from about 5 cm to about 20 cm, or of from about 5 cm to about 10 cm, or of from about 10 cm to about 20 cm.

In some cases, all or some of the components of the electronic device (including display and/or input device components) can be printed or coated onto a substrate using an ink or coating to make one continuous article. The substrate may be part of the material comprising the article of apparel (e.g. the cloth making up an article of clothing) or a substrate that is incorporated into or attached to the article of apparel.

Examples of components that can be printed include components for touchpads, displays, screens, input devices, touchpad surfaces and panels, x-y grids for capacitive devices, batteries, connectors, wires, dielectrics, resistors, backplanes and frontplanes for displays, antennas, chips, busbars, leads, wires, panels, circuits, transistors, electrodes, sensors, RFID components (e.g. tags, chips, antennas), switches, etc.

Figure 6A:
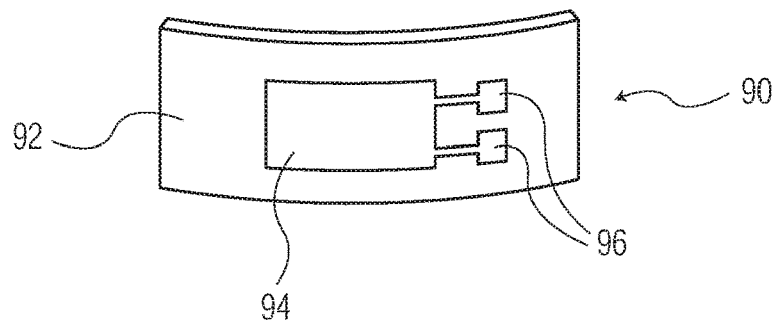
FIG. 6(a) shows a wearable electronic device having a display and/or input device printed directly onto an article of apparel.

FIG. 6(a) shows a wearable electronic device 90 having a piece of apparel (such as a strap, band, belt, etc.) 92 that comprises a material (such as a fabric, leather, rubber, plastic, elastomer, etc.) onto whose surface a display and/or input device component 94 and control buttons and/or other components 96 have been directly printed.

Figure 6B:
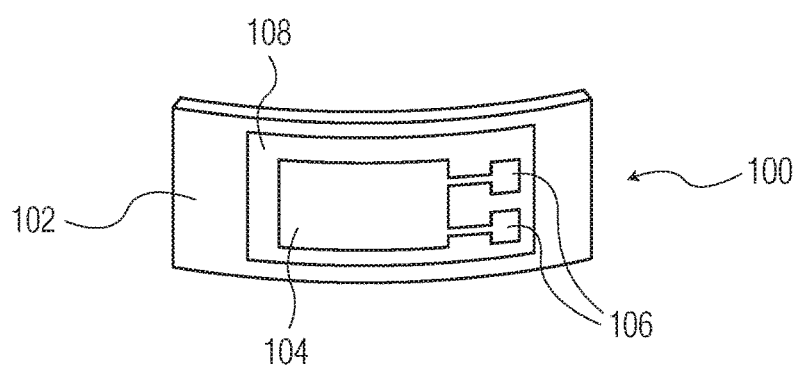
FIG. 6(b) shows a wearable electronic device having a display and/or input device printed onto a substrate that is affixed to an article of apparel.

FIG. 6(b) shows a wearable electronic device 100 having a piece of apparel (such as a strap, band, belt, etc.) 102 that comprises a material (such as a fabric, leather, rubber, plastic, elastomer, etc.). Display and/or input device 104 and control buttons and/or other components 106 have been printed on substrate 108. Printed substrate 108 has been affixed (such as by sewing, gluing, laminating, snaps, buttons, zippers, tying, hook and loop (e.g. Velcro®) type attachments, tacks, rivets, fasteners, etc.) to the surface of piece of apparel 102.

Additional flexible and/or rigid components can be printed onto the material, affixed to the surface, embedded within the material. Portions of the strap material and/or printed substrate, if used, (including portions having other components) can be covered with other materials, coatings, protective layers, etc.

Examples of printing or coating methods include, but are not limited to, painting, pouring, spin casting, solution casting, dip coating, powder coating, by syringe or pipette, spray coating, curtain coating, lamination, co-extrusion, electrospray deposition, ink-jet printing, spin coating, thermal transfer (including laser transfer) methods, doctor blade printing, screen printing, rotary screen printing, gravure printing, lithographic printing, intaglio printing, digital printing, capillary printing, offset printing, electrohydrodynamic (EHD) printing (a method of which is described in WO 2007/053621, which is hereby incorporated herein by reference), microprinting, pad printing, tampon printing, stencil printing, wire rod coating, drawing, flexographic printing, stamping, xerography, microcontact printing, dip pen nanolithography, laser printing, via pen or similar means, etc. Multiple layers can be applied.

After they have been applied to a substrate, the inks and coatings may be cured using any suitable technique, including drying and oven-drying (in air or another inert or reactive atmosphere), UV curing, IR curing, drying, cross-linking, thermal curing, laser curing, IR curing, microwave curing or drying, sintering, and the like.

Examples of substrates include, but are not limited to, rigid materials, flexible and/or stretchable materials, silicones and other elastomers and other polymeric materials, metals (such as aluminum, copper, steel, stainless steel, etc.), adhesives, heat-sealable materials (such as cellulose, biaxially oriented polypropylene (BOPP), poly(lactic acid), polyurethanes, etc.), fabrics (including cloths) and textiles (such as cotton, wool, polyesters, rayon, etc.), clothing, leather, suede, skin, glasses and other minerals, ceramics, silicon surfaces, wood, paper, cardboard, paperboard, cellulose-based materials, glassine, labels, silicon and other semiconductors, laminates, corrugated materials, concrete, bricks, fiber-reinforced materials (such as glass fiber reinforced materials, glass fiber-reinforced epoxy resins, fiberglass, etc.) and other building materials, etc. Substrates can in the form of films, papers, wafers, etc.

The substrates can have been treated with other coatings (such as paints) or similar materials before the poles applied. Examples include substrates (such as PET) coated with indium tin oxide, antimony tin oxide, etc. They can be woven, nonwoven, in mesh form; etc. They can be woven, nonwoven, in mesh form; etc.

The substrates can be paper-based materials generally (including paper, paperboard, cardboard, glassine, etc.). Paper-based materials can be surface treated or impregnated. Examples of surface treatments include coatings such as polymeric coatings, which can include PET, polyethylene, polypropylene, biaxially oriented polypropylene (BOPP), acetates, nitrocellulose, etc. Coatings can be adhesives. Paper based materials can be sized.

Examples of polymeric materials include, but are not limited to, those comprising thermoplastics and thermosets, including elastomers and rubbers (including thermoplastics and thermosets), phenolic resins, paper-reinforced phenolic resins, silicones, fluorinated polysiloxanes, natural rubber, butyl rubber, chlorosulfonated polyethylene, chlorinated polyethylene, styrene/butadiene copolymers (SBR), styrene/ethylene/butadiene/stryene copolymers (SEBS), styrene/ethylene/butadiene/stryene copolymers grafted with maleic anhydride, styrene/isoprene/styrene copolymers (SIS), polyisoprene, nitrile rubbers, hydrogenated nitrile rubbers, neoprene, ethylene/propylene copolymers (EPR), ethylene/propylene/diene copolymers (EPDM), ethylene/vinyl acetate copolymer (EVA), hexafluoropropylene/vinylidene fluoride/tetrafluoroethylene copolymers, tetrafluoroethylene/propylene copolymers, fluorelastomers, polyesters (such as poly(ethylene terephthalate), poly(butylene terephthalate), poly (ethylene naphthalate), liquid crystalline polyesters, poly (lactic acid), etc.); polystyrene; polyamides (including polyterephthalamides); polyimides (such as Kapton®); aramids (such as Kevlar® and Nomex®); fluoropolymers (such as fluorinated ethylene propylene (FEP), polytetrafluoroethylene (PTFE), poly(vinyl fluoride), poly(vinylidene fluoride), etc.); polyetherimides; poly(vinyl chloride); poly(vinylidene chloride); polyurethanes (such as thermoplastic polyurethanes (TPU); spandex, cellulosic polymers (such as cellulose, nitrocellulose, cellulose acetate, etc.); styrene/acrylonitriles polymers (SAN); arcrylonitrile/butadiene/styrene polymers (ABS); polycarbonates; polyacrylates; poly(methyl methacrylate); ethylene/vinyl acetate copolymers; thermoset epoxies and polyurethanes; polyolefins (such as polyethylene (including low density polyethylene, high density polyethylene, ultrahigh molecular weight polyethylene, etc.), polypropylene (such as biaxially-oriented polypropylene, etc.); Mylar; etc. They can be non-woven materials, such as DuPont Tyvek®. They can be adhesive or adhesive-backed materials (such as adhesive-backed papers or paper substitutes). They can be mineral-based paper substitutes such as Teslin® from PPG Industries. The substrate can be a transparent or translucent or optical material, such as glass, quartz, polymer (such as polycarbonate or poly(meth)acrylates (such as poly(methyl methacrylate).

The inks and coatings can be electrically conductive. Examples of electrically conductive inks or coatings include those based on electrically conductive components such as metals, conductive polymers, graphene and other conductive carbon-based materials, etc.

Metals (including metal alloys), conductive metal oxides, conductive carbons, polymers, metal-coated materials, etc. These components can take a variety of forms, including particles, powders, flakes, foils, needles, etc.

Examples of metals include, but are not limited to silver, copper, aluminum, platinum, palladium, nickel, chromium, gold, zinc, tin, iron, gold, lead, steel, stainless steel, rhodium, titanium, tungsten, magnesium, brass, bronze, colloidal metals, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene (PEDOT), poly(styrenesulfonate) (PSS), PEDOT:PSS copolymers, polythiophene and polythiophenes, poly (3-alkylthiophenes), poly(2,5-bis(3-tetradecylthiophen-2-yl)thieno[3,2-b]thiophene) (PBTTT), poly (phenylenevinylene), polypyrene, polycarbazole, polyazulene, polyazepine, polyflurorenes, polynaphthalene, polyisonaphthalene, polyaniline, polypyrrole, poly(phenylene sulfide), polycarbozoles, polyindoles, polyphenylenes, copolymers of one or more of the foregoing, etc., and their derivatives and copolymers. The conductive polymers may be doped or undoped. They may be doped with boron, phosphorous, iodine, etc.

Examples of conductive carbons and carbonaceous materials include, but are not limited to, graphene and graphene sheets, graphite (including natural, Kish, and synthetic, annealed, pyrolytic, highly oriented pyrolytic, etc. graphites), graphitized carbon, carbon black, mesoporous carbon, carbon fibers and fibrils, carbon whiskers, vapor-grown carbon nanofibers, metal coated carbon fibers, carbon nanotubes (including single- and multi-walled nanotubes), fullerenes, activated carbon, carbon fibers, expanded graphite, expandable graphite, graphite oxide, hollow carbon spheres, carbon foams, etc.

By the terms "ink" and "coating" are meant composition that are in a form that is suitable for application to a substrate as well as the material after it is applied to the substrate, while it is being applied to the substrate, and both before and after any post-application treatments (such as evaporation, cross-linking, curing, etc.). The components of the ink and coating compositions may vary during these stages.

The inks can coatings can be transparent, partially transparent, opaque, etc.

Inks and coating compositions can have binders (such as polymer binders). Binders can be thermosets, thermoplastics, non-melt processable polymers, etc. Polymers can also comprise monomers that can be polymerized before, during, or after the application of the coating to the substrate. Polymeric binders can be crosslinked or otherwise cured after the coating has been applied to the substrate. Examples of polymers include, but are not limited to polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral) (PVB), poly(vinyl formal), poly(methyl methacrylate) and other acrylate polymers and copolymers (such as methyl methacrylate polymers, methacrylate copolymers, polymers derived from one or more acrylates, methacrylates, ethyl acrylates, ethyl methacrylates, butyl acrylates, butyl methacrylates, glycidyl acrylates and methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), poly(vinyl acetate) and poly(vinyl acetate) copolymers, poly(vinyl pyrrolidone) and poly(vinyl pyrrolidone) copolymers, vinyl acetate and vinyl pyrrolidone copolymers, polycarbonates (PC), polyamides, polyesters, liquid crystalline polymers (LCPs), poly(lactic acid) (PLA), poly(phenylene oxide) (PPO), PPO-polyamide alloys, polysulphone (PSU), polysulfides, polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), poly(vinyl chloride) (PVC), polyurethanes (thermoplastic and thermosetting (including crosslinked polyurethanes such as those crosslinked amines, etc.), aramides (such as Kevlar® and Nomex®), polysulfides, polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane), etc.), elastomers, epoxy polymers (including crosslinked epoxy polymers such as those crosslinked with polysulfones, amines, etc.), polyureas, alkyds, cellulosic polymers (such as nitrocellulose, ethyl cellulose, ethyl hydroxyethyl cellulose, carboxymethyl cellulose, cellulose acetate, cellulose acetate propionates, and cellulose acetate butyrates), polyethers (such as poly(ethylene oxide), poly(propylene oxide), poly(propylene glycol), oxide/propylene oxide copolymers, etc.), acrylic latex polymers, polyester acrylate oligomers and polymers, polyester diol diacrylate polymers, phenoxy resins, UV-curable resins, etc.

Examples of elastomers include, but are not limited to, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly(propylene oxide), and their copolymers).

Examples of polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6)) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, the polyamide of hexamethyleneterephthalamide, and 2-methylpentamethyleneterephthalamide), etc. The polyamides may be polymers and copolymers (i.e., polyamides having at least two different repeat units) having melting points between about 120 and 255° C. including aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, etc. Examples of these include those sold under the trade names Macromelt by Henkel and Versamid by Cognis.

Examples of acrylate polymers include those made by the polymerization of one or more acrylic acids (including acrylic acid, methacrylic acid, etc.) and their derivatives, such as esters. Examples include methyl acrylate polymers, methyl methacrylate polymers, and methacrylate copolymers. Examples include polymers derived from one or more acrylates, methacrylates, acrylic acid, methacrylic acid, methyl acrylate, methyl methacrylate, ethyl acrylate, ethyl methacrylate, butyl acrylate, butyl methacrylate, glycidyl acrylate, glycidyl methacrylates, 2-ethylhexyl acrylate, 2-ethylhexyl methacrylate, hydroxyethyl acrylate, hydroxyethyl (meth)acrylate, acrylonitrile, and the like. The polymers may comprise repeat units derived from other monomers such as olefins (e.g. ethylene, propylene, etc.), vinyl acetates, vinyl alcohols, vinyl pyrrolidones, etc. They may include partially neutralized acrylate polymers and copolymers (such as ionomer resins).

Examples of polymers include Elvacite® polymers supplied by Lucite International, Inc., including Elvacite® 2009, 2010, 2013, 2014, 2016, 2028, 2042, 2045, 2046, 2550, 2552,2614, 2669, 2697, 2776, 2823, 2895, 2927, 3001, 3003, 3004, 4018, 4021, 4026, 4028, 4044, 4059, 4400, 4075, 4060, 4102, etc. Other polymer families include Bynel® polymers (such as Bynel® 2022 supplied by DuPont) and Joncryl® polymers (such as Joncryl® 678 and 682).

Examples of polyesters include, but are not limited to, poly(butylene terephthalate) (PBT), poly(ethylene terephthalate) (PET), poly(1,3-propylene terephthalate) (PPT), poly(ethylene naphthalate) (PEN), poly(cyclohexanedimethanol terephthalate) (PCT)), etc.

In some embodiment, the polymer has a acid number of at least about 5, or at least about 10, or at least about 15, or at least about 20.

In some embodiments, the glass transition temperature of at least one polymer is no greater than about 100° C., 90° C., or no greater than about 80° C., or no greater than about 70° C., or no greater than about 60° C., or no greater than about 50° C., or no greater than about 40° C.

In some cases, when a binder is used, it can be present relative to the electrically conductive components in from about 1 to about 99 weight percent, or from about 1 to about 50 weight percent, or from about 1 to about 30 weight percent, or from about 1 to about 20 weight percent, or from about 5 to about 80 weight percent, or from about 5 to about 60 weight percent, or from about 5 to about 30 weight percent, or from about 15 to about 85 weight percent, or from about 15 to about 60 weight percent, or from about 15 to about 30 weight percent, or from about 25 to about 80 weight percent, or from about 25 to about 50 weight percent, or from about 40 to about 90 weight percent, or from about 50 to about 90 weight percent, or from about 70 to about 95 weight percent, based on the total weight of binder and electrically conductive component.

Inks and coating compositions can contain additives such as dispersion aids (including surfactants, emulsifiers, and wetting aids), adhesion promoters, thickening agents (including clays), defoamers and antifoamers, biocides, additional fillers, flow enhancers, stabilizers, crosslinking and curing agents, conductive additives, etc.

Examples of dispersing aids include glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec.

Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, etc. salts of stearates, oleats, palmitates, etc.), aluminosilicates (such as those sold under the Minex® name by Unimin Specialty Minerals and Aerosil® 9200 by Evonik Degussa), fumed silica, natural and synthetic zeolites, etc.

The compositions may optionally comprise at least one "multi-chain lipid", by which term is meant a naturally-occurring or synthetic lipid having a polar head group and at least two nonpolar tail groups connected thereto. Examples of polar head groups include oxygen-, sulfur-, and halogen-containing, phosphates, amides, ammonium groups, amino acids (including α-amino acids), saccharides, polysaccharides, esters (Including glyceryl esters), zwitterionic groups, etc.

The tail groups may be the same or different. Examples of tail groups include alkanes, alkenes, alkynes, aromatic compounds, etc. They may be hydrocarbons, functionalized hydrocarbons, etc. The tail groups may be saturated or unsaturated. They may be linear or branched. The tail groups may be derived from fatty acids, such as oleic acid, palmitic acid, stearic acid, arachidic acid, erucic acid, arachadonic acid, linoleic acid, linolenic acid, oleic acid, etc.

Examples of multi-chain lipids include, but are not limited to, lecithin and other phospholipids (such as phosphatidylcholine, phosphoglycerides (including phosphatidylserine, phosphatidylinositol, phosphatidylethanolamine (cephalin), and phosphatidylglycerol) and sphingomyelin); glycolipids (such as glucosyl-cerebroside); saccharolipids; sphingolipids (such as ceramides, di- and triglycerides, phosphosphingolipids, and glycosphingolipids); etc. They may be amphoteric, including zwitterionic.

The inks and coatings compositions can comprise of solvents such as water, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Ecolink)), terpenes and terpene alcohols (including terpineols, including alpha-terpineol), limonene, aliphatic petroleum distillates, alcohols (such as methanol, ethanol, n-propanol, i-propanol, n-butanol, i-butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8,trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers, ester and alcohols (such as 2-(2-ethoxyethoxy)ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by SpecialChem)), dibasic esters (such as dimethyl succinate, dimethyl glutarate, dimethyl adipate), dimethylsulfoxide (DMSO), 1,3-dimethyl-3,4,5,6-tetrahydro-2(1H)-pyrimidinone (DMPU), imides, amides (such as dimethylformamide (DMF), dimethylacetamide, etc.), cyclic amides (such as N-methylpyrrolidone and 2-pyrrolidone), lactones (such as beta-propiolactone, gamma-valerolactone, delta-valerolactone, gamma-butyrolactone, epsilon-caprolactone), cyclic imides (such as imidazolidinones such as N,N'-dimethylimidazolidinone (1,3-dimethyl-2-imidazolidinone)), aromatic solvents and aromatic solvent mixtures (such as toluene, xylenes, mesitylene, cumene, etc.), petroleum distillates, naphthas (such as VM&P naphtha), and and mixtures of two or more of the foregoing and mixtures of one or more of the foregoing with other carriers. Solvents can be low- or non-VOC solvents, non-hazardous air pollution solvents, and non-halogenated solvents.

Electrically conductive inks and coatings compositions can comprise graphene sheets. Graphene sheets are graphite sheets preferably having a surface area of from about 100 to about 2630 m²/g. In some embodiments, the graphene sheets primarily, almost completely, or completely comprise fully exfoliated single sheets of graphite (these are approximately ≤1 nm thick and are often referred to as "graphene"), while in other embodiments, at least a portion of the graphene sheets may comprise partially exfoliated graphite sheets, in which two or more sheets of graphite have not been exfoliated from each other. The graphene sheets may comprise mixtures of fully and partially exfoliated graphite sheets. Graphene sheets are distinct from carbon nanotubes. Graphene sheets may have a "platey" (e.g. two-dimensional) structure and do not have the needle-like form of carbon nanotubes. The two longest dimensions of the graphene sheets may each be at least about 10 times greater, or at least about 50 times greater, or at least about 100 times greater, or at least about 1000 times greater, or at least about 5000 times greater, or at least about 10,000 times greater than the shortest dimension (i.e. thickness) of the sheets.

Graphene sheets are distinct from expanded, exfoliated, vermicular, etc. graphite, which has a layered or stacked structure in which the layers are not separated from each other. The graphene sheets do not need to be entirely made up of carbon, but can have heteroatoms incorporated into the lattice or as part of functional groups attached to the lattice. The lattice need not be a perfect hexagonal lattice and may contain defects (including five- and seven-membered rings).

Graphene sheets may be made using any suitable method. For example, they may be obtained from graphite, graphite oxide, expandable graphite, expanded graphite, etc. They may be obtained by the physical exfoliation of graphite, by for example, peeling, grinding, milling, graphene sheets. They made be made by sonication of precursors such as graphite. They may be made by opening carbon nanotubes. They may be made from inorganic precursors, such as silicon carbide. They may be made by chemical vapor deposition (such as by reacting a methane and hydrogen on a metal surface). They may be made by epitaxial growth on substrates such as silicon carbide and metal substrates and by growth from metal-carbon melts. They made by made They may be made by the reduction of an alcohol, such ethanol, with a metal (such as an alkali metal like sodium) and the subsequent pyrolysis of the alkoxide product (such a method is reported in *Nature Nanotechnology* (2009), 4, 30-33). They may be made from small molecule precursors such as carbon dioxide, alcohols (such as ethanol, methanol, etc.), alkoxides (such as ethoxides, methoxides, etc., including sodium, potassium, and other alkoxides). They may be made by the exfoliation of graphite in dispersions or exfoliation of graphite oxide in dispersions and the subsequently reducing the exfoliated graphite oxide. Graphene sheets may be made by the exfoliation of expandable graphite, followed by intercalation, and ultrasonication or other means of separating the intercalated sheets (see, for example, *Nature Nanotechnology* (2008), 3, 538-542). They may be made by the intercalation of graphite and the subsequent exfoliation of the product in suspension, thermally, etc. Exfoliation processes may be thermal, and include exfoliation by rapid heating, using microwaves, furnaces, hot baths, etc.

Graphene sheets may be made from graphite oxide (also known as graphitic acid or graphene oxide). Graphite may be treated with oxidizing and/or intercalating agents and exfoliated. Graphite may also be treated with intercalating agents and electrochemically oxidized and exfoliated. Graphene sheets may be formed by ultrasonically exfoliating suspensions of graphite and/or graphite oxide in a liquid (which may contain surfactants and/or intercalants). Exfoliated graphite oxide dispersions or suspensions can be subsequently reduced to graphene sheets. Graphene sheets may also be formed by mechanical treatment (such as grinding or milling) to exfoliate graphite or graphite oxide (which would subsequently be reduced to graphene sheets).

Graphene sheets may be made by the reduction of graphite oxide. Reduction of graphite oxide to graphene may be done by thermal reduction/annealing, chemical reduction, etc. and may be carried out on graphite oxide in a solid form, in a dispersion, etc. Examples of useful chemical reducing agents include, but are not limited to, hydrazines (such as hydrazine (in liquid or vapor forms, N,N-dimethylhydrazine, etc.), sodium borohydride, citric acid, hydroquinone, isocyanates (such as phenyl isocyanate), hydrogen, hydrogen plasma, etc. A dispersion or suspension of exfoliated graphite oxide in a carrier (such as water, organic solvents, or a mixture of solvents) can be made using any suitable method (such as ultrasonication and/or mechanical grinding or milling) and reduced to graphene sheets. Reduction can be solvothermal reduction, in solvents such as water, ethanol, etc. This can for example be done in an autoclave at elevated temperatures (such as those above about 200° C.).

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, nitrates (such as sodium and potassium nitrates), perchlorates, potassium chlorate, sodium chlorate, chromic acid, potassium chromate, sodium chromate, potassium dichromate, sodium dichromate, hydrogen peroxide, sodium and potassium permanganates, phosphoric acid ($H_3PO_4$), phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. Preferred intercalation agents include sulfuric acid. Graphite may also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US 2007/0092432, the disclosure of which is hereby incorporated herein by reference. The thusly formed graphene sheets may display little or no signature corresponding to graphite or graphite oxide in their X-ray diffraction pattern.

The thermal exfoliation may be carried out in a continuous, semi-continuous batch, etc. process.

Heating can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating may be done using a flash lamp or with microwave. During heating, the graphite oxide may be contained in an essentially constant location in single batch reaction vessel, or may be transported through one or more vessels during the reaction in a continuous or batch mode. Heating may be done using any suitable means, including the use of furnaces and infrared heaters.

Examples of temperatures at which the thermal exfoliation and/or reduction of graphite oxide can be carried out are at least about 150° C., at least about 200° C., at least about 300° C., at least about 400° C., at least about 450° C., at least about 500° C., at least about 600° C., at least about 700° C., at least about 750° C., at least about 800° C., at least about 850° C., at least about 900° C., at least about 950° C., at least about 1000° C., at least about 1100° C., at least about 1500° C., at least about 2000° C., and at least about 2500° C.

Preferred ranges include between about 750 about and 3000° C., between about 850 and 2500° C., between about 950 and about 2500° C., between about 950 and about 1500° C., between about 750 about and 3100° C., between about 850 and 2500° C., or between about 950 and about 2500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature may vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets may be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used may be, for example, between about 750 about and 3000° C., or between about 850 and 2500° C., or between about 950 and about 2500° C.

The time of heating can be for example, at least about 1 second, or at least about 10 second, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature may vary within these ranges.

The heating may be done under a variety of conditions, including in an inert atmosphere (such as argon or nitrogen) or a reducing atmosphere, such as hydrogen (including hydrogen diluted in an inert gas such as argon or nitrogen), or under vacuum. The heating may be done in any appropriate vessel, such as a fused silica or a mineral or ceramic vessel or a metal vessel. The materials being heated including any starting materials and any products or intermediates) may be contained in an essentially constant location in single batch reaction vessel, or may be transported through one or more vessels during the reaction in a continuous or batch reaction. Heating may be done using any suitable means, including the use of furnaces and infrared heaters.

The graphene sheets preferably have a surface area of at least about 100 $m^2/g$ to, or of at least about 200 $m^2/g$, or of at least about 300 $m^2/g$, or of least about 350 $m^2/g$, or of least about 400 $m^2/g$, or of least about 500 $m^2/g$, or of least about 600 $m^2/g$., or of least about 700 $m^2/g$, or of least about 800 $m^2/g$, or of least about 900 $m^2/g$, or of least about 700 $m^2/g$. The surface area may be about 400 to about 1100 $m^2/g$. The theoretical maximum surface area can be calculated to be 2630 $m^2/g$. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 $m^2/g$.

The graphene sheets can have number average aspect ratios of about 100 to about 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 $m^2$ of surface covered per one mg of MB adsorbed.

The graphene sheets may have a bulk density of from about 0.01 to at least about 200 kg/$m^3$. The bulk density includes all values and subvalues therebetween, especially including 0.05, 0.1, 0.5, 1, 5, 10, 15, 20, 25, 30, 35, 50, 75, 100, 125, 150, and 175 kg/$m^3$.

The graphene sheets may be functionalized with, for example, oxygen-containing functional groups (including, for example, hydroxyl, carboxyl, and epoxy groups) and typically have an overall carbon to oxygen molar ratio (C/O ratio), as determined by bulk elemental analysis, of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 15:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets may contain atomic scale kinks. These kinks may be caused by the presence of lattice defects in, or by chemical functionalization of the two-dimensional hexagonal lattice structure of the graphite basal plane.

Compositions comprising graphene sheets may further comprise graphite (including natural, Kish, and synthetic, annealed, pyrolytic, highly oriented pyrolytic, etc. graphites). In some cases, the graphite can be present in from about 1 to about 99 percent, or from about 10 to about 99 percent, or from about 20 to about 99 percent, from about 30 to about 99 percent, or from about 40 to about 99 percent, or from about 50 to about 99 percent, or from about 60 to about 99 percent, or from about 70 to about 99 percent, or from about 80 to about 99 percent, or from about 85 to about 99 percent, or from about 90 to about 99 percent, or from about 1 to about 95 percent, or from about 10 to about 95 percent, or from about 20 to about 95 percent, from about 30 to about 95 percent, or from about 40 to about 95 percent, or from about 50 to about 95 percent, or from about 60 to about 95 percent, or from about 70 to about 95 percent, or from about 80 to about 95 percent, or from about 85 to about 95 percent, or from about 90 to about 95 percent, or from about 1 to about 80 percent, or from about 10 to about 80 percent, or from about 20 to about 80 percent, from about 30 to about 80 percent, or from about 40 to about 80 percent, or from about 50 to about 80 percent, or from about 60 to about 80 percent, or from about 70 to about 80 percent, or from about 1 to about 70 percent, or from about 10 to about 70 percent, or from about 20 to about 70 percent, from about 30 to about 70 percent, or from about 40 to about 70 percent, or from about 50 to about 70 percent, or from about 60 to about 70 percent, or from about 1 to about 60 percent, or from about 10 to about 60 percent, or from about 20 to about 60 percent, from about 30 to about 60 percent, or from about 40 to about 60 percent, or from about 50 to about 60 percent, or from about 1 to about 50 percent, or from about 10 to about 50 percent, or from about 20 to about 50 percent, from about 30 to about 50 percent, or from about 40 to about 50 percent, or from about 1 to about 40 percent, or from about 10 to about 40 percent, or from about 20 to about 40 percent, from about 30 to about 40 percent, from about 1 to about 30 percent, or from about 10 to about 30 percent, or from about 20 to about 30 percent, or from about 1 to about 20 percent, or from about 10 to about 20 percent, or from about 1 to about 10 percent, based on the total weight of graphene sheets and graphite.

The graphene sheets may comprise two or more graphene powders having different particle size distributions and/or morphologies. The graphite may also comprise two or more graphite powders having different particle size distributions and/or morphologies.

Inks and coatings compositions can be formed by blending the components (such as, depending on the ink or coating use and composition, one or more of the low Tg polymer, conductive additives, solvents, binders, other additives etc.). Blending can be done for example using solution/dispersion blending. The compositions may be made using any suitable method, including wet or dry methods and batch, semi-continuous, and continuous methods. Dispersions, suspensions, solutions, etc. of conductive components (such as graphene sheets) and/or other components can be made or processed (e.g., milled/ground, blended, dispersed, suspended, etc.) by using suitable mixing, dispersing, and/or compounding techniques.

For example, components of the inks and coatings may be processed (e.g., milled/ground, blended, etc. by using suitable mixing, dispersing, and/or compounding techniques and apparatus, including ultrasonic devices, high-shear mixers, ball mills, attrition equipment, sandmills, two-roll mills, three-roll mills, cryogenic grinding crushers, extruders, kneaders, double planetary mixers, triple planetary mixers, high pressure homogenizers, horizontal and vertical wet grinding mills, etc.) Processing (including grinding) technologies can be wet or dry and can be continuous or discontinuous. Suitable materials for use as grinding media include metals, carbon steel, stainless steel, ceramics, stabilized ceramic media (such as cerium yttrium stabilized zirconium oxide), PTFE, glass, tungsten carbide, etc. Methods such as these can be used to change the particle size and/or morphology of components such as conductive components (including carbon components, graphite, graphene sheets, metal particles, etc.)

Components may be processed together or separately and may go through multiple processing (including mixing/blending) stages, each involving one or more components (including blends).

After blending and/or grinding steps, additional components may be added to the compositions, including, but not limited to, thickeners, viscosity modifiers, binders, etc. The compositions may also be diluted by the addition of more carrier.

In some cases, one or more of the printed components can have an electrical conductivity of at least about $10^{-8}$ S/m. They can have a conductivity of about $10^{-6}$ S/m to about $10^5$ S/m, or of about $10^{-5}$ S/m to about $10^5$ S/m. In other embodiments of the invention, the coating has conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about 10,000 S/m, or at least about 20,000 S/m, or at least about 30,000 S/m, or at least about 40,000 S/m, or at least about 50,000 S/m, or at least about 60,000 S/m, or at least about 75,000 S/m, or at least about $10^5$ S/m, or at least about $10^6$ S/m.

In some cases, the surface resistivity of one or more printed components can be no greater than about 10,000,000 Ω/square/mil, or no greater than about 1,000,000 Ω/square/mil, or no greater than about 100,000 Ω/square/mil, or no greater than about 50,000 Ω/square/mil, or no greater than about 25,000 Ω/square/mil, or no greater than about 10,000 Ω/square/mil, or no greater than about 5000 Ω/square/mil, or no greater than about 1000 Ω/square/mil or no greater than about 700 Ω/square/mil, or no greater than about 500 Ω/square/mil, or no greater than about 350 Ω/square/mil, or no greater than about 200 Ω/square/mil, or no greater than about 200 Ω/square/mil, or no greater than about 150 Ω/square/mil, or no greater than about 100 Ω/square/mil, or no greater than about 75 Ω/square/mil, or no greater than about 50 Ω/square/mil, or no greater than about 30 Ω/square/mil, or no greater than about 20 Ω/square/mil, or no greater than about 10 Ω/square/mil, or no greater than about 5 Ω/square/mil, or no greater than about 1 Ω/square/ mil, or no greater than about 0.1 Ω/square/mil, or no greater than about 0.01 Ω/square/mil, or no greater than about 0.001 Ω/square/mil.

In some cases, the surface resistivity is between about 0.001 and about 5000 Ω/square/mil, or about 0.001 and about 1000 Ω/square/mil, or about 0.001 and about 500 Ω/square/mil, or about 0.001 and about 200 Ω/square/mil, or about 0.001 and about 100 Ω/square/mil, or about 0.001 and about 50 Ω/square/mil, or about 0.001 and about 40 Ω/square/mil, or about 0.001 and about 30 Ω/square/mil, or about 0.001 and about 20 Ω/square/mil, or about 0.001 and about 10 Ω/square/mil, or about 0.001 and about 5 Ω/square/mil, or about 0.001 and about 2 Ω/square/mil, or about 0.001 and about 1 Ω/square/mil, or about 0.001 and about 0.5 Ω/square/mil, or about 0.001 and about 0.1 Ω/square/mil, or about 0.001 and about 0.01 Ω/square/mil, or about 0.01 and about 5000 Ω/square/mil, or about 0.01 and about 1000 Ω/square/mil, or about 0.01 and about 500 Ω/square/mil, or about 0.01 and about 200 Ω/square/mil, or about 0.01 and about 100Ω/square/mil, or about 0.01 and about 50 Ω/square/mil, or about 0.01 and about 40 Ω/square/mil, or about 0.01 and about 30 Ω/square/mil, or about 0.01 and about 20 Ω/square/mil, or about 0.01 and about 10 Ω/square/mil, or about 0.01 and about 5 Ω/square/mil, or about 0.01 and about 2 Ω/square/mil, or about 0.01 and about 1 Ω/square/mil, or about 0.01 and about 0.5 Ω/square/mil, or about 0.01 and about 0.1 Ω/square/mil, or about 0.1 and about 5000 Ω/square/mil, or about 0.1 and about 1000 Ω/square/mil, or about 0.1 and about 500 Ω/square/mil, or about 0.1 and about 200 Ω/square/mil, or about 0.1 and about 100 Ω/square/mil, or about 0.1 and about 50 Ω/square/mil, or about 0.1 and about 40 Ω/square/mil, or about 0.1 and about 30 Ω/square/mil, or about 0.1 and about 20 Ω/square/mil, or about 0.1 and about 10 Ω/square/mil, or about 0.1 and about 5 Ω/square/mil, or about 0.1 and about 2 Ω/square/mil, or about 0.1 and about 1 Ω/square/mil, or about 0.1 and about 0.5 Ω/square/mil, or about 0.5 and about 5000 Ω/square/mil, or about 0.5 and about 1000 Ω/square/mil, or about 0.5 and about 500 Ω/square/mil, or about 0.5 and about 200 Ω/square/mil, or about 0.5 and about 100 Ω/square/mil, or about 0.5 and about 50 Ω/square/mil, or about 0.5 and about 40 Ω/square/mil, or about 0.5 and about 30 Ω/square/mil, or about 0.5 and about 20 Ω/square/mil, or about 0.5 and about 10 Ω/square/mil, or about 0.5 and about 5 Ω/square/mil, or about 0.5 and about 2 Ω/square/mil, or about 0.5 and about 1 Ω/square/mil, or about 1 and about 5000 Ω/square/mil, or about 1 and about 1000 Ω/square/mil, or about 1 and about 500 Ω/square/mil, or about 1 and about 200 Ω/square/mil, or about 1 and about 100 Ω/square/mil, or about 1 and about 50 Ω/square/mil, or about 1 and about 40 Ω/square/mil, or about 1 and about 30 Ω/square/mil, or about 1 and about 20 Ω/square/mil, or about 1 and about 10 Ω/square/mil, or about 1 and about 5 Ω/square/mil, or about 1 and about 2 Ω/square/mil, or about 2 and about 5000 Ω/square/mil, or about 2 and about 1000 Ω/square/mil, or about 2 and about 500 Ω/square/mil, or about 2 and about 200 Ω/square/mil, or about 2 and about 100 Ω/square/mil, or about 2 and about 50 Ω/square/mil, or about 2 and about 40 Ω/square/mil, or about 2 and about 30 Ω/square/mil, or about 2 and about 20 Ω/square/mil, or about 2 and about 10 Ω/square/mil, or about 2 and about 5 Ω/square/mil, or about 5 and about 5000 Ω/square/mil, or about 5 and about 1000 Ω/square/mil, or about 5 and about 500 Ω/square/mil, or about 5 and about 200 Ω/square/mil, or about 5 and about 100 Ω/square/mil, or about 5 and about 50 Ω/square/mil, or about 5 and about 40 Ω/square/mil, or about 5 and about 30Ω/square/mil, or about 5 and about 20 Ω/square/mil, or about 5 and about 10 Ω/square/mil, or about 10 and about 5000 Ω/square/mil, or about 10 and about 1000 Ω/square/mil, or about 10 and about 500 Ω/square/mil, or about 10 and about 200 Ω/square/mil, or about 10 and about 100 Ω/square/mil, or about 10 and about 50 Ω/square/mil, or about 10 and about 40 Ω/square/mil, or about 10 and about 30 Ω/square/mil, or about 10 and about 20 Ω/square/mil, or about 20 and about 5000 Ω/square/mil, or about 20 and about 1000 Ω/square/mil, or about 20 and about 500 Ω/square/mil, or about 20 and about 200 Ω/square/mil, or about 20 and about 100 Ω/square/mil, or about 20 and about 50 Ω/square/mil, or about 20 and about 40 Ω/square/mil, or about 20 and about 30 Ω/square/mil, or about 30 and about 5000 Ω/square/mil, or about 30 and about 1000 Ω/square/mil, or about 30 and about 500 Ω/square/mil, or about 30 and about 200 Ω/square/mil, or about 30 and about 100 Ω/square/mil, or about 30 and about 50 Ω/square/mil, or about 30 and about 40 Ω/square/mil, or about 50 and about 5000 Ω/square/mil, or about 50 and about 1000 Ω/square/mil, or about 50 and about 500 Ω/square/mil, or about 50 and about 200 Ω/square/mil, or about 50 and about 100 Ω/square/mil, or about 100 and about 5000 Ω/square/mil, or about 100 and about 1000 Ω/square/mil, or about 100 and about 500 Ω/square/mil, or about 100 and about 200 Ω/square/mil, or about 200 and about 5000 Ω/square/mil, or about 200 and about 1000 Ω/square/mil, or about 200 and about 500 Ω/square/mil, or about 500 and about 5000 Ω/square/mil, or about 500 and about 1000 Ω/square/mil, or about 1000 and about 5000 Ω/square/mil.

In some cases, the one or more printed components can be thermally conductive. In some cases they can have a thermal conductivity of about 0.1 to about 50 W/m·K, or of about 0.5 to about 30 W/m·K, or of about 0.1 to about 0.5 W/m·K, or of about 0.1 to about 1 W/m·K, or of about 0.1 to about 5 W/m·K, or of about 0.5 to about 2 W/m·K, or of about 1 to about 5 W/m·K, or of about 0.1 to about 0.5 W/m·K, or of about 0.1 to about 50 W/m·K, or of about 1 to about 30 W/m·K, or of about 1 to about 20 W/m·K, or of about 1 to about 10 W/m·K, or of about 1 to about 5 W/m·K, or of about 2 to about 25 W/m·K, or of about 5 to about 25 W/m·K, or of at least about 0.7 W/m·K, or of at least 1 W/m·K, or of at least 1.5 W/m·K, or of at least 3 W/m·K, or of at least 5 W/m·K, or of at least 7 W/m·K, or of at least 10 W/m·K, or of at least 15 W/m·K.

The invention claimed is:

1. A flexible wearable electronic device comprising:
   a flexible article of apparel;
   a plurality of components in communication with the flexible article of apparel, each of the plurality of components configured to be flexible;
   wherein
   the plurality of components comprise a display and an input device;
   at least a portion of the plurality of components are printed on to a surface of the flexible article of apparel using an electrically conductive ink; and
   the electrically conductive ink comprises:
   a polymeric binder; and
   single sheets of graphene that are up to 1 nm thick;
   wherein each of the plurality of components are configured to have a radius of curvature of no more than 5 cm when folded.

2. The flexible wearable electronic device of claim 1, wherein the display comprises a flexible backplane.

3. The flexible wearable electronic device of claim 1, wherein a component of the plurality of components comprises a capacitive device x-y grid.

4. The flexible wearable electronic device of claim 1, wherein the single sheets of graphene include atomic scale kinks.

5. The flexible wearable electronic device of claim 1, wherein the electrically conductive ink is transparent.

6. A method to fabricate a flexible wearable electronic device, comprising:
- adhering a plurality of components on to a surface of a flexible article of apparel each of the plurality of components configured to be flexible; and
- wherein
  - the plurality of components comprise a display and an input device; and
  - adhering the plurality of components comprises printing at least a portion of the plurality of components using an electrically conductive ink comprising a polymeric binder and single sheets of graphene each having a thickness of up to 1 nm;
- wherein printing the component comprises printing the component to have a radius of curvature of no more than 5 cm when folded.

7. The method of claim 6, wherein printing the component comprises printing a backplane for the display on the surface.

8. The method of claim 6, wherein printing the component comprises printing an x-y grid for the input device on the surface.

9. The method of claim 6, wherein the single sheets of graphene comprise atomic scale kinks.

10. The method of claim 6, wherein the electrically conductive ink is transparent.

* * * * *